United States Patent [19]
Drake et al.

[11] Patent Number: 6,040,257
[45] Date of Patent: Mar. 21, 2000

[54] HYDROCARBON CONVERSION CATALYST COMPOSITION AND PROCESSES THEREFOR AND THEREWITH

[75] Inventors: Charles A. Drake, Nowata; An-hsiang Wu; Jianhua Yao, both of Bartlesville, all of Okla.

[73] Assignee: Phillips Petroleum Company, Bartlesville, Okla.

[21] Appl. No.: 08/966,137

[22] Filed: Nov. 7, 1997

[51] Int. Cl.[7] .............................. B01J 29/06; B01J 21/00; B01J 21/16; B01J 27/14
[52] U.S. Cl. ................................ 502/64; 502/71; 502/77; 502/80; 502/81; 502/208; 502/214
[58] Field of Search .................... 502/64, 71, 77, 502/80, 81, 208, 214, 86

[56] References Cited

U.S. PATENT DOCUMENTS

| | | | |
|---|---|---|---|
| 4,182,923 | 1/1980 | Chu | 585/475 |
| 4,456,780 | 6/1984 | Young | 585/475 |
| 4,665,251 | 5/1987 | Chu | 585/415 |
| 4,804,801 | 2/1989 | Yan | 585/407 |
| 4,918,256 | 4/1990 | Nemet-Mavrodin | 585/415 |
| 4,954,243 | 9/1990 | Kuehl et al. | 208/120 |
| 5,053,374 | 10/1991 | Absil et al. | 502/64 |
| 5,231,064 | 7/1993 | Absil et al. | 502/68 |
| 5,348,643 | 9/1994 | Absil et al. | 208/114 |
| 5,776,852 | 7/1998 | Wu et al. | 502/177 |
| 5,804,059 | 9/1998 | Wu et al. | 208/135 |
| 5,827,422 | 10/1998 | Drake et al. | 208/135 |
| 5,866,741 | 2/1999 | Wu et al. | 585/475 |
| 5,866,742 | 2/1999 | Wu et al. | 585/475 |
| 5,866,744 | 2/1999 | Wu et al. | 585/486 |
| 5,883,033 | 3/1999 | Drake et al. | 502/68 |
| 5,883,034 | 3/1999 | Drake et al. | 502/68 |

*Primary Examiner*—Steven P. Griffin
*Assistant Examiner*—Cam N. Nguyen
*Attorney, Agent, or Firm*—Richmond, Hitchcock, Fish & Dollar

[57] ABSTRACT

A catalyst composition, a process for producing the composition, and a hydrocarbon conversion process for converting a hydrocarbon stream such as, for example, gasoline, to olefins and $C_6$ to $C_8$ aromatic hydrocarbons such as benzene, toluene and xylenes are disclosed. The catalyst composition comprises a zeolite and phosphorus. The process for producing the composition comprises the steps of: (1) combining a zeolite with a phosphorus compound under a condition sufficient to produce a phosphorus-promoted zeolite; and (2) heating the phosphorus-promoted zeolite. The hydrocarbon conversion process comprises contacting a hydrocarbon stream with the catalyst composition under a condition sufficient to effect the conversion of a saturated hydrocarbon to an olefin and a $C_6$ to $C_8$ aromatic hydrocarbon.

3 Claims, No Drawings

HYDROCARBON CONVERSION CATALYST COMPOSITION AND PROCESSES THEREFOR AND THEREWITH

FIELD OF THE INVENTION

This invention relates to a composition useful for converting a hydrocarbon to a $C_6$ to $C_8$ aromatic hydrocarbon and an olefin, to a process for producing the composition, and to a process for using the composition for converting a hydrocarbon to a $C_6$ to $C_8$ aromatic hydrocarbon and an olefin.

BACKGROUND OF THE INVENTION

It is well known to those skilled in the art that aromatic hydrocarbons and olefins are each a class of very important industrial chemicals which find a variety of uses in petrochemical industry. It is also well known to those skilled in the art that catalytically cracking gasoline-range hydrocarbons produces lower olefins such as, for example, propylene; and aromatic hydrocarbons such as, for example, benzene, toluene, and xylenes (hereinafter collectively referred to as BTX) in the presence of catalysts which contain a zeolite. The product of this catalytic cracking process contains a multitude of hydrocarbons including unconverted $C_5+$ alkanes; lower alkanes such as methane, ethane, and propane; lower alkenes such as ethylene and propylene; $C_6$–$C_8$ aromatic hydrocarbons; and $C_9+$ aromatic compounds which contain 9 or more carbons per molecule. Recent efforts to convert gasoline to more valuable petrochemical products have therefore focused on improving the conversion of gasoline to olefins and aromatic hydrocarbons by catalytic cracking in the presence of zeolite catalysts. For example, a gallium-promoted zeolite ZSM-5 has been used in the so-called Cyclar Process to convert a hydrocarbon to BTX.

Olefins and aromatic hydrocarbons can be useful feedstocks for producing various organic compounds and polymers. However, the weight ratio of olefins to aromatic compounds produced by the conversion process is generally low. Additionally, a zeolite catalyst is generally deactivated in a rather short period, especially in a high sulfur and/or high polyaromatic environment, because of depositions of carbonaceous material, generally coke, on the surface of the catalyst. Therefore, development of a catalyst and a process for converting hydrocarbons to the more valuable olefins and BTX and for reducing coke deposition would be a significant contribution to the art and to the economy.

SUMMARY OF THE INVENTION

An object of this invention is to provide a catalyst composition which can be used to convert a hydrocarbon to a $C_6$ to $C_8$ aromatic hydrocarbon and an olefin. Also an object of this invention is to provide a process for producing the catalyst composition. Another object of this invention is to provide a process which can employ the catalyst composition to convert a hydrocarbon to an olefin and a $C_6$ to $C_8$ aromatic hydrocarbon. An advantage of the catalyst composition is that it enhances the ratio of produced olefins to BTX. Another advantage of the catalyst composition is that it suppresses the deposition of coke during a hydrocarbon conversion process. Other objects and advantages will becomes more apparent as this invention is more fully disclosed hereinbelow.

According to a first embodiment of the present invention, a composition which can be used as a catalyst for converting a saturated hydrocarbon or a hydrocarbon mixture containing a saturated hydrocarbon to an olefin and a $C_6$ to $C_8$ aromatic hydrocarbon is provided. The composition comprises a zeolite and phosphorus.

According to a second embodiment of the present invention, a process which can be used for producing a catalyst composition is provided. The process comprises, consists essentially of, or consists of the steps: (1) optionally contacting a zeolite with steam whereby a steamed zeolite is formed; (2) optionally contacting a zeolite or the steamed zeolite with an acid in an amount and under a condition effective to produce an acid-leached zeolite; (3) combining a zeolite, which can also be the steamed zeolite and/or the acid-leached zeolite with a phosphorus compound under a condition sufficient to incorporate the phosphorus compound into the zeolite to produce a modified zeolite; and (4) heat-treating the modified zeolite to produce a phosphorus-promoted zeolite.

According to a third embodiment of the present invention, a process which can be used for converting a hydrocarbon or a hydrocarbon mixture to an olefin and a $C_6$ to $C_8$ aromatic hydrocarbon is provided which comprises, consists essentially of, or consists of, contacting a fluid which comprises a saturated hydrocarbon or a hydrocarbon mixture containing a saturated hydrocarbon with a catalyst composition, which can be the same as disclosed above in the first embodiment of the invention, under a condition effective to convert a saturated hydrocarbon to an olefin and an aromatic hydrocarbon containing 6 to 8 carbon atoms per molecule wherein the weight ratio of the olefin to aromatic compound is enhanced.

DETAILED DESCRIPTION OF THE INVENTION

The catalyst composition of the first embodiment of the present invention can comprise, consist essentially of, or consist of a zeolite, an olefin enhancing amount of phosphorus, and optionally a binder. According to the present invention the weight ratio of binder to zeolite can be any ratio that can enhance the production of an olefin from a saturated hydrocarbon and can be in the range of from about 1:20 to about 20:1, preferably about 1:10 to about 10:1, and most preferably about 1:7 to about 5:1.

The weight percent of phosphorus in the composition can be any percent as long as the percent can suppress the coke formation during a hydrocarbon conversion process, or enhance the ratio of olefin to BTX in the product stream, or both. Generally, the percent can be in the range of from about 2 to about 4% if the phosphorus is derived from an inorganic phosphorus compound or in the range of from about 0.5 to about 10, preferably about 1 to about 7, and most preferably about 1 to about 4% if the phosphorus is derived from an organic phosphorus compound.

The weight ratio of olefin(s) to BTX is generally at least about 0.40, preferably at least about 0.45, and most preferably at least about 0.50. The weight % of coke deposited on a zeolite composition in an about 6 hour hydrocarbon conversion process is preferably less than about 1%, more preferably less than about 0.8%, even more preferably less than about 0.6%, and most preferably less than abut 0.3%.

Any binders known to one skilled in the art for use with a zeolite are suitable for use herein. Examples of suitable binders include, but are not limited to, clays such as kaolinite, halloysite, vermiculite, chlorite, attapulgite, smectite, montmorillonite, illite, saconite, sepiolite, palygorskite, and combinations of two or more thereof;

aluminas such as for example α-alumina and γ-alumina; silicas; alumina-silica; aluminum phosphate; aluminum chlorohydrate; and combinations of two or more thereof. Because these binders are well known to one skilled in the art, description of which is omitted herein. The presently preferred binder, if employed, is alumina because it is readily available.

The composition can further be characterized by having the following physical characteristics: a surface area as determined by the BET method using nitrogen in the range of from about 300 to about 600, preferably 350 to 500 m²/g; a pore volume in the range of from about 0.4 to about 0.8, preferably about 0.5 to about 0.75, and most preferably 0.6 to 0.75 ml/g; an average pore diameter in the range of from about 70 to about 300, preferably about 100 to about 250, and most preferably 125 to 200 Å; and a porosity of more than about 50%.

According to the present invention, any compound containing phosphorus can be used as precursor for the phosphorus. Illustrated hereinbelow are some examples of suitable phosphorus compound.

Any phosphorus compounds that, when impregnated onto or incorporated into a zeolite can be converted into phosphorus oxide, are capable of reducing coke deposition on a zeolite, as compared to the use of the zeolite only, can be used in the present invention. Examples of suitable phosphorus-containing compounds include, but are not limited to, ammonium phosphate, phosphorus pentoxide, phosphorus oxychloride, phosphorous acid, phosphoric acid, phosphites such as triethyl phosphite and triethylphosphite, phosphates $P(O)(OR)_3$ such as triethyl phosphate and tripropyl phosphate, $P(O)(R)_3$, phosphines $P(R)_3$, and combinations of any two or more thereof wherein R is a hydrocarbyl radical having 1 to about 20 carbon atoms per radical.

Any commercially available zeolite which can catalyze the conversion of a hydrocarbon to an aromatic compound and an olefin can be employed in the present invention. Examples of suitable zeolites include, but are not limited to, those disclosed in Kirk-Othmer Encyclopedia of Chemical Technology, third edition, volume 15 (John Wiley & Sons, New York, 199 1) and in W. M. Meier and D. H. Olson, "Atlas of Zeolite Structure Types," pages 138–139 (Butterworth-Heineman, Boston, Mass., 3rd ed. 1992). Optionally a zeolite can be steam- and/or acid-treated before using the present invention. The presently preferred zeolites are those having medium pore sizes and having the physical characteristics disclosed above. ZSM-5 and similar zeolites that have been identified as having a framework topology identified as MFI are particularly preferred because of their shape selectivity.

The composition of the present invention can be prepared by combining a zeolite, a phosphorus compound and optionally a binder in the weight ratios or percent disclosed above under any conditions sufficient to effect the production of such a composition. Preferably the zeolite is stream-treated, acid-treated, or both. The term "steam-treated zeolite" or "acid-treated zeolite" refers to a zeolite that has been heated with steam or treated with an acid, respectively.

According to the present invention, a zeolite, preferably a ZSM-5 zeolite, a phosphorus compound and optionally a binder can be well mixed at about 15 to about 100° C. under atmospheric pressure, generally in a liquid such as water or a hydrocarbon, by any means known to one skilled in the art such as stirring, blending, kneading, or extrusion, following which the resulting mixture can be dried in air at a temperature in the range of from about 20 to about 800° C., for about 0.5 to about 50 hours under any pressures that accommodate the temperatures, preferably under atmospheric pressure. Thereafter, the dried, zeolite-binder mixture can be further heat-treated at a temperature in the range of from about 200 to 1000° C., preferably about 250 to about 750° C., and most preferably 350 to 650° C. for about 1 to about 30 hours to prepare the present composition. The heat treatment can be carried out by air calcination or steam.

Generally a zeolite, before a binder is combined with the zeolite, can also be calcined under similar conditions to remove any contaminants, if present, to prepare a calcined zeolite.

A zeolite, whether it has been calcined or contains a binder, can also be treated with steam. The treatment of a zeolite, which can contain a binder, with steam can be carried out in any suitable container or vessel known to one skilled in the art at about 100° C. to about 1000° C. for about 1 to about 30 hours under any pressure that can accommodate the temperatures to produce a steamed zeolite.

A zeolite, whether it has been steamed or not, can be treated with an acid before the preparation of the present composition. Generally, any organic acids, inorganic acids, or combinations of any two or more thereof can be used in the process of the present invention so long as the acid can reduce the aluminum content in the zeolite. The acid can also be a diluted aqueous acid solution. Examples of suitable acids include, but are not limited to sulfuric acid, hydrochloric acid, nitric acid, phosphoric acid, formic acid, acetic acid, oxalic acid, trifluoroacetic acid, trichloroacetic acid, p-toluenesulfonic acid, methanesulfonic acid, partially or fully neutralized acids wherein one or more protons have been replaced with, for example, a metal (preferably an alkali metal) or ammonium ion, and combinations of any two or more thereof. Examples of partially or fully neutralized acids include, but are not limited to, sodium bisulfate, sodium dihydrogen phosphate, potassium hydrogen tartarate, ammonium sulfate, ammonium chloride, ammonium nitrate, and combinations thereof.

Any methods known to one skilled in the art for treating a solid catalyst with an acid can be used in the acid treatment of the present invention. Generally, a zeolite material, whether or not it contains a binder, or has been steamed, can be suspended in an acid solution. The concentration of the zeolite in the acid solution can be in the range of from about 0.01 to about 700, preferably about 0.1 to about 600, more preferably about 1 to about 550, and most preferably 5 to 500 grams per liter. The amount of acid required is the amount that can maintain the solution in acidic pH during the treatment. Preferably the initial pH of the acid solution containing a zeolite is adjusted to lower than about 7, preferably lower than about 6. Upon the pH adjustment of the solution, the solution can be subjected to a treatment at a temperature in the range of from about 30° C. to about 200° C., preferably about 50° C. to about 150° C., and most preferably 70° C. to 120° C. for about 10 minutes to about 30 hours, preferably about 20 minutes to about 25 hours, and most preferably 30 minutes to 20 hours. The treatment can be carried out under a pressure in the range of from about 1 to about 10 atmospheres (atm), preferably about 1 atm so long as the desired temperature can be maintained. Thereafter, the acid-treated zeolite material can be washed with running water for 1 to about 60 minutes followed by drying, at about 50 to about 1000, preferably about 75 to about 750, and most preferably 100 to 650° C. for about 0.5 to about 15, preferably about 1 to about 12, and most preferably 1 to 10 hours, to produce an acid-leached zeolite. Any drying method known to one skilled in the art such as, for example, air drying, heat drying, spray drying, fluidized bed drying, or combinations of two or more thereof can be used.

The dried, acid-leached zeolite can also be further washed, if desired, with a mild acid solution such as, for example, ammonium nitrate which is capable of maintaining the pH of the wash solution in acidic range. The volume of the acid generally can be the same volume as that disclosed above. The mild acid treatment can also be carried out under substantially the same conditions disclosed in the acid treatment disclosed above. Thereafter, the resulting solid can be washed and dried as disclosed above.

It should be noted that, a zeolite can be acid-leached before it is treated with steam.

The dried, acid-leached zeolite, whether it has been further washed with a mild acid or not, can be either heated with steam or calcined, if desired, under a condition known to those skilled in the art. Generally such a condition can include a temperature in the range of from about 250 to about 1,000, preferably about 350 to about 750, and most preferably 450 to 650° C. and a pressure in the range of from about 0.5 to about 50, preferably about 0.5 to about 30, and most preferably 0.5 to 10 atmospheres (atm) for about 1 to about 30 hours, preferably about 2 to about 20 hours, and most preferably 3 to 15 hours.

A zeolite, a calcined zeolite, or a calcined zeolite-binder mixture, can be treated with a compound containing an exchangeable ammonium ion to prepare an ammonium-exchanged zeolite. Because ion exchange of exchangeable ions in a zeolite is well known to one skilled in the art, therefore, the description of which is omitted herein for the interest of brevity.

In the second embodiment of the invention, a zeolite or a zeolite-binder mixture, which could have been steamed and/or acid-leached, in a desired ionic form, regardless whether calcined or not, can be combined with a phosphorus compound to produce a phosphorus-promoted zeolite. The phosphorus-promoted zeolite can also be produced by contacting a zeolite and a phosphorus compound, in a solution or suspension, under a condition known to those skilled in the art to incorporate a phosphorus compound into a zeolite. Because the methods for incorporating or impregnating a phosphorus compound into a zeolite a solid composition such as, for example, impregnation by incipient wetness method, are well known to those skilled in the art, the description of which is also omitted herein for the interest of brevity.

The composition of the invention then can be, if desired, pretreated with a reducing agent before being used in a transalkylation or hydrodealkylation process for converting a hydrocarbon to an olefin and an aromatic hydrocarbon. The presently preferred reducing agent is a hydrogen-containing fluid which comprises molecular hydrogen ($H_2$) in the range of from 1 to about 100, preferably about 5 to about 100, and most preferably 10 to 100 volume %. The reduction can be carried out at a temperature, in the range of from about 250° C. to about 800° C. for about 0.1 to about 10 hours preferably about 300° C. to about 700° C. for about 0.5 to about 7 hours, and most preferably 350° C. to 650° C. for 1 to 5 hours. The treatment with a reducing agent can also be carried out in-situ in a reactor which is used for a hydrocarbon conversion process.

In a preferred embodiment, the composition of the invention can be produced by the steps comprising, consisting essentially of, or consisting of: (1) contacting a zeolite with steam to produce a steamed zeolite; (2) contacting the steamed zeolite with a phosphorus compound in a liquid to produce a phosphorus-promoted zeolite; and (3) heating the phosphorus-promoted zeolite wherein the amount of the phosphorus compound is the amount that can result in a coke-suppressing or -reducing amount of phosphorus in the phosphorus-promoted zeolite.

In another preferred embodiment, the composition of the invention can be produced by the steps comprising, consisting essentially of, or consisting of: (1) contacting a zeolite, which can contain a binder, with an acid under a condition sufficient to reduce the aluminum content of the zeolite to produce an acid-leached zeolite; which can be calcined; (2) contacting the acid-leached zeolite with a phosphorus compound, generally in a liquid, to produce a phosphorus-promoted zeolite in which the phosphorus compound is in an amount such that the finished composition contains phosphorus in an amount disclosed above in the first embodiment of the invention; and (3) heating the phosphorus-promoted zeolite.

Still, in another preferred embodiment, the composition of the invention can be produced by the steps comprising, consisting essentially of, or consisting of: (1) contacting a zeolite, which can contain a binder, with an acid under a condition sufficient to reduce the aluminum content of the zeolite to produce an acid-leached zeolite; which can be calcined; (2) contacting the acid-leached zeolite with steam to produce a steamed zeolite; (3) contacting the steamed zeolite with a phosphorus compound, generally in a liquid, to produce a phosphorus-promoted zeolite in which the phosphorus compound is in an amount such that the finished composition contains phosphorus in an amount disclosed above in the first embodiment of the invention; and (3) heating the phosphorus-promoted zeolite.

The definitions and scopes of the zeolite, and phosphorus compound are the same as those disclosed above. The conditions of heating such as calcining or steaming can also be the same as those disclosed above. Generally the amount of the liquid required is the amount that is enough to produce a zeolite paste which can be converted to desired physical forms or shape, before the heating step, by any means known to one skilled in the art such as, for example, extrusion. Additionally, before the heating step, the phosphorus-promoted zeolite can also be dried by any means known to one skilled in the art.

According to the third embodiment of the present invention, a process useful for converting at least one saturated hydrocarbon or a hydrocarbon mixture containing at least one saturated hydrocarbon to a mixture rich in olefins and $C_6$ to $C_8$ aromatic hydrocarbons is disclosed. The process comprises, consists essentially of, or consists of contacting a fluid stream comprising a hydrocarbon or hydrocarbon mixture which can comprise paraffins, olefins, naphthenes, and aromatic compounds with a catalyst composition under a condition sufficient to effect the conversion of a hydrocarbon mixture to a mixture rich in olefins and $C_6$ to $C_8$ aromatic hydrocarbons or to enhance the weight ratio of olefins (ethylene and propylene) to the $C_6$ to $C_8$ aromatic compounds. The catalyst composition can be the same as that disclosed in the first embodiment of the invention and can be produced by the second embodiment of the invention.

The fluid stream also comprises a diluent selected from the group consisting of carbon dioxide, nitrogen, helium, carbon monoxide, steam, hydrogen, and combinations of two or more thereof. The presently preferred diluents are nitrogen and carbon dioxide for they are readily available and effective. The weight ratio of the diluent to the hydrocarbon is in the range of from about 0.01:1 to about 10:1, preferably about 0.05:1 to about 5:1, and most preferably 0.1:1 to about 2:1.

The term "fluid" is used herein to denote gas, liquid, vapor, or combinations thereof. The term "hydrocarbon" is generally referred to, unless otherwise indicated, as one or more hydrocarbons having from about 4 carbon atoms to about 30 carbon atoms, preferably about 5 to about 20 carbon atoms, and most preferably 5 to 16 carbon atoms per molecule. The term "enhance or enhanced" refers to an increased weight ratio of olefins to BTX employing the catalyst composition as compared to employing only a zeolite such as commercially available ZSM-5. Examples of a hydrocarbon include, but are not limited to butane, isobutane, pentane, isopentane, hexane, isohexane, cyclohexane, heptane, isoheptane, octane, isooctane, nonane, decane, undecane, dodecane, tridecane, tetradecane, pentadecane, hexadecane, butenes, isobutene, pentenes, hexenes, benzene, toluene, ethylbenzene, xylenes, and combinations of any two or more thereof.

According to the present invention, in the product stream, the ratio of olefins to $C_6$–$C_8$ aromatic hydrocarbons is preferably at least about 0.8:1, more preferably at least about 0.9:1, even more preferably at least about 0.9:1, and most preferably at least about 1:1.

Any fluid which contains a hydrocarbon as disclosed above can be used as the feed for the process of this invention. Generally, the fluid feed stream can also contain olefins, naphthenes (cycloalkanes), or some aromatic compounds. Examples of suitable, available fluid feeds include, but are not limited to, gasolines from catalytic oil cracking processes, pyrolysis gasolines from thermal cracking of saturated hydrocarbons, naphthas, gas oils, reformates, and combinations of any two or more thereof. The origin of this fluid feed is not critical. Though particular composition of a feed is not critical, a preferred fluid feed is derived from gasolines which generally contain more paraffins (alkanes) than combined content of olefins and aromatic compounds (if present).

The contacting of a fluid feed stream containing a hydrocarbon with the catalyst composition can be carried out in any technically suitable manner, in a batch or semicontinuous or continuous process, under a condition effective to convert a hydrocarbon to a $C_6$ to $C_8$ aromatic hydrocarbon. Generally, a fluid stream as disclosed above, preferably being in the vaporized state, is introduced into an aromatization reactor having a fixed catalyst bed, or a moving catalyst bed, or a fluidized catalyst bed, or combinations of any two or more thereof by any means known to one skilled in the art such as, for example, pressure, meter pump, and other similar means. Because an aromatization reactor and aromatization are well known to one skilled in the art, the description of which is omitted herein for the interest of brevity. The condition can include a weight hourly space velocity of the fluid stream in the range of about 0.01 to about 100, preferably about 0.05 to about 50, and most preferably 0.1 to 30 g feed/g catalyst/hour. Generally, the pressure can be in the range of from about 0 to about 1000 psig, preferably about 0 to about 200 psig, and most preferably 0 to 50 psig, and the temperature is about 250 to about 1000° C., preferably about 350 to about 750° C., and most preferably 450 to 650° C.

The process effluent generally contains a light gas fraction comprising hydrogen and methane; a $C_2$–$C_3$ fraction containing ethylene, propylene, ethane, and propane; an intermediate fraction including non-aromatic compounds higher than 3 carbon atoms; and a BTX aromatic hydrocarbons fraction (benzene, toluene, ortho-xylene, meta-xylene and para-xylene). Generally, the effluent can be separated into these principal fractions by any known methods such as, for example, fractionation distillation. Because the separation methods are well known to one skilled in the art, the description of which is omitted herein. The intermediate fraction can be recycled to an aromatization reactor described above, methane, ethane, and propane can be used as fuel gas or as a feed for other reactions such as, for example, in a thermal cracking process to produce ethylene and propylene. The olefins can be recovered and further separated into individual olefins by any method known to one skilled in the art. The individual olefins can then be recovered and marketed. The BTX fraction can be further separated into individual $C_6$ to $C_8$ aromatic hydrocarbon fractions. Alternatively, the BTX fraction can undergo one or more reactions either before or after separation to individual $C_6$ to $C_8$ hydrocarbons so as to increase the content of the most desired BTX aromatic hydrocarbon. Suitable examples of such subsequent $C_6$ to $C_8$ aromatic hydrocarbon conversions are disproportionation of toluene (to form benzene and xylenes), transalkylation of benzene and xylenes (to form toluene), and isomerization of meta-xylene and/or ortho-xylene to para-xylene.

After the catalyst composition has been deactivated by, for example, coke deposition or feed poisons, to an extent that the feed conversion and/or the selectivity to the desired ratios of olefins to BTX have become unsatisfactory, the catalyst composition can be reactivated by any means known to one skilled in the art such as, for example, calcining in air to burn off deposited coke and other carbonaceous materials, such as oligomers or polymers, preferably at a temperature of about 400 to about 650° C. The optimal time periods of the calcining depend generally on the types and amounts of deactivating deposits on the catalyst composition and on the calcination temperatures. These optimal time periods can easily be determined by those possessing ordinary skills in the art and are omitted herein for the interest of brevity.

The following examples are presented to further illustrate this invention and are not to be construed as unduly limiting the scope of the present invention.

EXAMPLE I

This example illustrates the preparation of catalyst composition of the invention.

A zeolite HZSM-5 purchased from UCI (United Catalysts, Inc., Louisville, Ky.) having a designate of T-4480 (30 weight % alumina) (obtained as $\frac{1}{16}$ inch extrudates) was used in the preparation of the catalyst composition of the invention (catalyst A).

Thirty-two (32) g of T-4480 was combined with 100 g of 6N HCl in a beaker to form a suspension. The suspension was heated at 90° C. for 2 hours. Upon decantation of spent HCl solution, the solid was washed with running tap water for 30 minutes, dried in air at 115° C., and calcined at 525° C. for 3 hours to produce 22.64 g of acid-leached zeolite (catalyst B).

The above-produced zeolites were further analyzed for their surface area, pore volume, and pore radius (Table I) as well as the weight % of individual component (Table II).

The unit cell dimension (also referred to as unit cell size; measured in angstroms) was determined by X-ray diffraction, essentially in accordance with ASTM D 3942-80.

The ratio of Si atoms to Al atoms in the crystalline zeolite framework portion was determined by Si solid state NMR spectrometry, substantially in accordance with the procedure described by J. Klinowski et al in Nature, Apr. 1982, Volume 296, pages 533–536. The Si:Al atomic ratio (or Si/Al) in the crystalline framework portion for the invention composition was found between 22.0 and 25.7.

Because zeolites generally also contain a substantially amorphous silica-alumina portion besides the crystalline zeolite portion, the total Si content and the total Al content were determined by X-ray fluorescence spectrometry employing a Siemens MRS 400 multi-channel spectrometer.

The surface area was determined in accordance with a modified BET/$N_2$ method (ASTM method D 3037), wherein the relative partial pressure of the gas phase, $p/p_0$ was in the range of about 0.01–0.06 ($p=N_2$ partial pressure in the gas phase, at the test conditions; $p_0$=vapor pressure of $N_2$ at its boiling point under the test conditions).

Pore volume was determined by mercury intrusion porosimetry carried out at room temperature and a mercury pressure ranging from an initial pressure of 0 psig to a final pressure of 60,000 psig using an Autopore 9200 instrument of Micromeritics, Norcross, Ga. The average pore diameter was calculated by first dividing the pore volume by surface area to obtain a number Q and then multiplying Q by 4.

These analytical methods are well known to those skilled in the art and have been disclosed in U.S. Pat. Nos. 4,663,025 and 4,975,399, disclosures of which are incorporated herein by reference.

TABLE I

Sorption Data

|  | T-4480 (catalyst A) | Acid-leached T-4480 (catalyst B) |
|---|---|---|
| Surface Area (m²/g) | | |
| micro- | 212.10 | 285.30 |
| meso- | 174.20 | 148.60 |
| BET | 386.30 | 433.90 |
| Pore Volume (ml/g) | | |
| micro | 0.0898 | 0.1203 |
| meso- | 0.4492 | 0.6829 |
| Total | 0.5351 | 0.5806 |
| Avg Pore Radius (Å) | | |
| micro- | 28 | 27 |
| meso | 63 | 157 |
| Porosity (%) | 48.48 | 55.33 |

Microproe size <20Å
Mesoproe size 20–500Å
Macroproe size >500Å

The results shown in Table I demonstrate that acid-leached ZSM-5 had higher BET surface area, pore volume, and pore radius than the original zeolite T-4480.

TABLE II

Element Weight %[a]

|  | T-4480 (catalyst A) | Acid-leached T-4480 (catalyst B) |
|---|---|---|
| Aluminum | 12.80 | 3.10 |
| Silicon | 32.10 | 40.50 |

TABLE II-continued

Element Weight %[a]

|  | T-4480 (catalyst A) | Acid-leached T-4480 (catalyst B) |
|---|---|---|
| Sodium | 0.11 | 0.12 |
| Magnesium | 0.31 | 0.18 |
| Calcium | 0 | 0 |

[a]The atomic weight % is expressed as 100% times the element weight divided by the total weight of the respective zeolites.

Table II shows that acid-leached zeolite had considerably reduced aluminum (and thus alumina) content.

A T-4480 zeolite (25 g) described above was soaked with 30.88 g of 19 weight % triethylphosphate (TEP) hexane followed by calcination at 530° C. for 3 hours to produce catalyst C containing 2% phosphorus.

Catalyst D was produced by the same procedure described for catalyst C except that 1.7 g of $(NH_4)_3PO_4$ dissolved in 10 g of $H_2O$ was employed. Catalyst D contained 3.9 weight % phosphorus.

Catalyst E was produced using the procedure described for catalyst D except that 0.8 g of $(NH_4)_3PO_4$ dissolved in 10 g of $H_2O$ was used. Catalyst E contained 1.8 weight % P.

Catalyst F was produced by the procedure of catalyst C except that 1.4 g of $H_3PO_4$ dissolved in 10 g of $H_2O$ was used. Catalyst F contained 3.8 weight % P.

Catalyst G contained 1.9 weight % phosphorus and was produced using the same procedure described for catalyst F except that 0.7 g of $H_3PO_4$ dissolved in 10 g of $H_2O$ was used.

Catalyst H contained 1.8% phosphorus and was produced by the procedure of catalyst E except that the P-impregnated zeolite was steamed at 650° C. for 4 hours, instead of being calcined.

Catalysts I–N were produced by the same procedure described for catalyst C except that (1) the zeolite employed was an acid-leached (catalyst B) and then steam-treated T4480 at 650° C. for 4 hours in a quartz U-shape tube; and (2) the quantity of TEP was adjusted such that the final weight % of P of each of catalysts I–N are as shown in Table IV below.

Catalyst O was produced by the same procedure as catalyst C except that triethylphosphite, instead of triethylphosphate, was used.

EXAMPLE II

This example illustrates the use of the catalyst compositions described in Example I as catalysts in the conversion of aliphatic hydrocarbons to olefins and BTX.

A quartz reactor tube (inner diameter 1 centimeter; length 60 centimeter) was filled with a 20 centimeter bottom layer of Alundum® alumina (inert, low surface area alumina), 5 grams of one of the catalysts in the middle 20 centimeter of the tube, and a 20 centimeter top layer of Alundum® alumina. The liquid feed was a catalytically cracked gasoline obtained from one of Phillips Petroleum Company refineries, Bartlesville, Okla. and contained hydrocarbons shown in Table III. The liquid feed shown in Table III is summarized as: 34 weight percent (%) lights ($C_5$s and $C_6$S); 1.3% benzene; 5.6% toluene; 9.3% $C_8$ aromatics; 22.3% nonaromatics in BTX boiling range; and 27% heavies ($C_8$+).

The feed was introduced into the reactor at a rate of 14 ml/hour (10.44 g/hour). The reaction temperature was 600° C. The reactor effluent was cooled and separated into a gaseous phase and a liquid phase. Both phases were analyzed by gas chromatographs at intervals of about 1 hour. Six hours after the feed was started, reactor effluent was sample and analyzed by gas chromatography for olefins and BTX content. Table IV below illustrates the production of olefins and BTX from the Table III feed and individual catalyst compositions produced in Example I. Total olefins included are ethylene and propylene.

TABLE III

Hydrocarbon Analysis Cat Cracked Gasoline

|  | n-paraffins | Isoparaffins | Aromatics | Naphthenes | Olefins | Total |
|---|---|---|---|---|---|---|
| $C_1$ | 0.000 | 0.000 | 0.000 | 0.000 | 0.000 | 0.000 |
| $C_2$ | 0.000 | 0.000 | 0.000 | 0.000 | 0.000 | 0.000 |
| $C_3$ | 0.000 | 0.000 | 0.000 | 0.000 | 0.000 | 0.000 |
| $C_4$ | 0.000 | 0.000 | 0.000 | 0.000 | 0.018 | 0.018 |
| $C_5$ | 1.292 | 8.147 | 0.000 | 0.169 | 10.741 | 20.348 |
| $C_6$ | 0.749 | 7.164 | 1.266 | 1.972 | 7.135 | 18.287 |
| $C_7$ | 0.740 | 4.576 | 5.354 | 2.746 | 6.483 | 19.899 |
| $C_8$ | 0.760 | 3.234 | 8.120 | 2.531 | 0.830 | 15.475 |
| $C_9$ | 0.187 | 2.070 | 8.187 | 0.708 | 0.125 | 11.278 |
| $C_{10}$ | 0.163 | 1.193 | 5.155 | 0.072 | 0.048 | 6.631 |
| $C_{11}$ | 0.153 | 0.307 | 3.606 | 0.191 | 0.000 | 4.257 |
| $C_{12}$ | 0.115 | 0.974 | 0.768 | 0.088 | 0.000 | 1.946 |
| $C_{13}$ | 0.048 | 0.000 | 0.000 | 0.000 | 0.000 | 0.048 |
| $C_{14}$ | 0.000 | 0.000 | 0.000 | 0.000 | 0.000 | 0.000 |
| Total | 4.208 | 27.664 | 32.457 | 8.478 | 23.381 | 98.188 |
|  |  |  |  |  | Total $C_{15}$+ | 0.108 |
|  |  |  |  |  | Total Unknowns: | 1.704 |

TABLE IV

| | Product (weight %) | | | | Ratio | |
|---|---|---|---|---|---|---|
| Catalyst | $C_2^=$ | $C_3^=$ | BTX | Total | Olefins/BTX | % Coke |
| A (T-4480) | 6.4 | 6.8 | 42.0 | 55.7 | 0.24 | 4.4 |
| B (T-4480; AL) | 5.7 | 3.9 | 50.1 | 59.7 | 0.16 | 1.7 |
| C (2% P) | 11.4 | 14.9 | 27.6 | 53.9 | 0.49 | 0.42 |
| D (3.9% P) | 6.5 | 15.5 | 21.3 | 43.3 | 0.52 | 0.21 |
| B (1.8% P) | 6.3 | 5.3 | 44.6 | 56.2 | 0.21 | 1.11 |
| F (3.8% P) | 10.4 | 15.2 | 26.4 | 52.1 | 0.51 | 0.64 |
| G (1.9% P) | 2.1 | 5.7 | 45.3 | 53.1 | 0.15 | 0.81 |
| H (1.8% P) | 8.2 | 7.1 | 42.8 | 58.1 | 0.26 | 0.86 |
| I (T-4480; AL; Stm) | 11.1 | 15.6 | 24.0 | 50.7 | 0.53 | 0.50 |
| J (0.5% P) | 11.0 | 12.9 | 31.8 | 55.7 | 0.43 | 3.40 |
| K (1.0% P) | 9.9 | 16.5 | 23.9 | 50.3 | 0.53 | 0.19 |
| L (1.5% P) | 9.2 | 16.0 | 24.5 | 49.7 | 0.51 | 0.16 |
| M (2% P) | 10.2 | 16.9 | 24.2 | 51.3 | 0.53 | 0.15 |
| N (3% P) | 7.1 | 15.0 | 22.9 | 45.0 | 0.49 | 0.25 |
| O (2% P) | 10.3 | 17.4 | 23.1 | 50.8 | 0.55 | 0.15 |

AL, acid-leached; Stm, steam; Catalyst I—O were acid-leached followed by heating with steam and then incorporation with phosphorus. The WHSV (weight hourly space velocity) of gasoline feed for each run was 2; coke was determined at the end of the reaction by removing the catalysts from the reactor and determined with a thermal gravimetric analyzer (TGA), manufactured by TA Instruments, New Castle, Delaware.

The results in Table IV show that the addition of TEP to acid leached ZSM-5 dramatically increased olefin production (catalyst C) and reduced coking rate compared to untreated acid leached ZSM-5 (catalyst B)

If the phosphorus source was ammonium phosphate, it caused very little change from the merely acid-leach T-4480 and if at the 1.8% level (catalyst E). However, if the phosphorus loading was increased to 3.9% (catalyst D) using ammonium phosphate, it was approximately equivalent to 2% phosphorus loading using TEP (catalyst M) and the coke level was very low with this amount of phosphorus loading.

A slight variation of catalyst E was shown by catalyst H. These two were the same except, in catalyst H, the phosphorus-impregnated acid-leached ZSM-5 was heated with steam for 4 hours at 650° C. instead of air calcining. It appeared this heat treatment had some lowering effect on coking rate.

When the phosphorus source was changed from ammonium phosphate to phosphoric acid at 1.9% loading, the yield of olefins was reduced and the amount of coke was also diminished (comparing catalyst E to catalyst G). However, at 3.9% phosphorus loading, the catalyst prepared using ammonium phosphate (catalyst D) produced less coke than the 3.8% phosphorus loading with phosphoric acid (catalyst F).

The addition of phosphorus, using TEP, to ZSM-5 which was both acid-leached and steamed had significant effect on coke reduction if a sufficient amount of phosphorus was added. For example, at 0.5% loading, results were inferior to no phosphorus addition (comparing catalyst J to catalyst I). At 1% phosphorus loading (catalyst K), olefin yield increased and coke declined. Raising the phosphorus loading to 2% (duplicate runs with catalysts M and O) produced even higher olefin to BTX ratio and lower coke.

EXAMPLE III

A ZSM-5 zeolite obtained from Chemie Uetikon AG, Uetikon, Switzerland having a product designation of Zeocat PZ 2/50H (obtained as powder) was used to produce other catalyst compositions.

First, the powder zeolite was extruded, following the addition of alumina (to a final 30 weight % alumina) and just enough water to make a paste, to produce 1/16 inch extrudates which were calcined at 500° C. for 3 hours (catalyst AA).

In another preparation, 10 g of PZ 2/50H was mixed with 2 g of bentonite. Following the addition of just enough water to make a paste, the paste was extruded to 1/16 extrudates which were heated to and at 500° C. for 3 hours to produce 12 g of a clay-bound zeolite containing 16.7 weight % clay (catalyst BB).

In a separate run, 10 g of catalyst BB, following the procedure described above, was steamed in a U-shape quartz tube at 650° C. for 4 hours with 500 cc/min helium and 20 ml/hr water. A steam-treated, clay-bound zeolite (total 9.43 g) was produced (catalyst CC) which contained 20 weight % clay by calculation.

Also in a separate run, 10 g of catalyst BB was treated with a sufficient amount of a solution prepared from 6 g of $(NH_4)_3PO_4$ and 50 ml of $H_2O$ to thoroughly wet the solid which was followed by drying in an oven at 115° C. for 1 hours and calcining at 530° C. for 3 hours. A zeolite (catalyst DD) (11 g) containing 7 weight % P was produced.

Still in a separate run, 36 g of PZ 2/50H powder, 42 ml of 0.9 M $(NH_4)_2HPO_4$ solution, and 14 g of bentonite were thoroughly mixed to form a paste. The resulting paste was extruded, dried, and calcined (530° C., 3 hours), following the procedure described above for the production of catalyst BB. A zeolite (catalyst EE) containing 3 weight % phosphorus and 28 weight % clay was produced.

Catalyst FF was produced by the same procedure as catalyst H except that the extruded material was steamed at 650° C. for 4 hours (total product 20 g). Catalyst FF contained 3 weight % P and 28 weight % clay.

Catalyst GG was produced by the same procedure as catalyst FF and contained 3 weight % P and 20 weight % clay.

Catalyst HH was produced by first mixing 18 g of PZ 2/50H powder, 7 g of bentonite, 0.6 g of zinc titanate, 0.5 g of magnesium silicate, and 21 ml of $H_2O$ to make a paste. The paste was extruded, dried, and heated with steam, as disclosed above for preparing catalysts FF and GG.

Catalyst II was produced by first mixing 18 g of PZ 2/50H zeolite powder with 7 g of bentonite, 0.4 g of zinc orthosilicate, and 21 ml of water to make a paste. The paste was extruded, dried, and steamed as disclosed above for producing catalyst FF.

Catalyst JJ was produced as follows. First, 36 g of PZ 2/50H zeolite was mixed with 14 g of bentonite, 0.8 g of zinc orthosilicate, and 47.5 ml of water to make a paste. Secondly, the paste was extruded, dried, and heated with steam as disclosed above for catalyst FF production to produce a Zn/Si-incorporated zeolite. Thirdly, the Zn/Si-incorporated zeolite was mixed with a triethylphosphate (TEP) solution containing 1.2 g of TEP and 20 g of n-hexane. The resulting mixture was left standing at about 20° C. for one hour to produce P-incorporated zeolite. Finally, following removal of excess hexane by evaporation, the P-incorporated zeolite was calcined at 530° C. for 3 hours. Catalyst JJ contained 2 weight % phosphorus.

Catalyst KK was produced by the same produced described for catalyst JJ except that the quantity of TEP used as 2.4 g. Catalyst KK contained 4 weight % phosphorus.

EXAMPLE IV

This example illustrates the use of the catalyst compositions described in Example III as catalysts in the conversion of hydrocarbons to olefins and BTX.

The conversion of hydrocarbons to olefins and aromatics was carried out the same as that disclosed in Example II. The results of the runs at about 6 hours are shown in Table V below which illustrates the production of olefins and BTX from the Table I feed and individual catalyst compositions produced in Example III.

TABLE V

Olefins and BTX Production (weight percent in product)

| Catalyst | Product yield (wt %) | | | | % Coke | Olefin BTX |
|---|---|---|---|---|---|---|
| | $C_2^=$ | $C_3^=$ | BTX | Total | | |
| A (T-4480) | 6.4 | 6.8 | 42 | 55.2 | 4.4 | 0.24 |
| AA (PZ 2/50H) | 6.6 | 8.5 | 38 | 53.1 | 4.9 | 0.40 |
| BB (PZ 2/50H + clay) | 7.8 | 6.8 | 42 | 56.6 | 1.20 | 0.35 |
| CC (PZ 2/50H + clay) + steam | 7.5 | 14.1 | 24 | 45.6 | 0.70 | 0.47 |
| DD (PZ 2/50H + clay + 7% P) + calcination | 8.4 | 14.5 | 25.4 | 48.3 | 0.42 | 0.47 |
| EE (PZ 2/50H + clay + 3% P) + calcination | 7.5 | 15.3 | 24.2 | 48.0 | 0.32 | 0.50 |
| FF (PZ 2/50H + clay + 3% P) + steam | 8.3 | 15.4 | 22.7 | 46.4 | 0.15 | 0.61 |
| GG (PZ 2/50H + clay + 3% P) + steam | 8.2 | 15.6 | 22.6 | 46.4 | 0.11 | 0.51 |
| HH (PZ 2/50H + clay + $ZnTiO_3$ + $Mg_2SiO_4$) | 7.8 | 11.8 | 40.5 | 60.1 | 0.28 | 0.48 |
| II (PZ 2/50H + clay + $Zn_2SiO_4$ + 2% P) | 6.9 | 14.1 | 35.1 | 56.1 | 0.15 | 0.60 |
| JJ (PZ 2/50H + clay + $Zn_2SiO_4$ + 4% P) | 5.2 | 13.4 | 24.9 | 43.5 | 0.24 | 0.75 |

The WHSV (weight hourly space velocity) of gasoline feed for each run was 2; coke was determined at the end of the reaction by removing the catalysts from the reactor and determined with a thermal gravimetric analyzer (TGA), manufactured by TA Instruments, New Castle, Delaware.

Table II shows that commercial ZSM-5 zeolites (catalysts A and AA) containing alumina binder had a high coke yield in a gasoline aromatization reaction. Addition of a bentonite clay at various concentrations (catalysts CC-JJ) significantly lowered the amount of coke yield. The results presented in Table V further demonstrate that a zeolite containing clay and phosphorus (catalysts DD-GG) further improved the olefin:BTX ratio in the product stream. Steaming a phosphorus-containing zeolite (catalysts FF and GG) not only significantly further reduced the coke formation but also increased the ratio of olefins to BTX. Furthermore, Table V shows that incorporation of $ZnTiO_3$ and $Mg_2SiO_4$ (catalyst HH) also significantly improved the production of olefins and reduced coke formation, as compared to catalyst AA. Finally, Table V shows that incorporation of $Zn_2SiO_4$ and phosphorus (catalyst II had 2 weight % P and catalyst JJ contained 4 weight % P), had profound effect on enhancing olefin:BTX ratio and reduction of coke formation in an aromatization process.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A process for the preparation of a catalyst suitable for the conversion of a hydrocarbon to a $C_6$ to $C_8$ aromatic hydrocarbon and an olefin which comprises
   (A) combining a ZSM-5 zeolite with a clay wherein the ratio of clay to zeolite is in the range of from about 1:20 to about 20:1;
   (B) contacting the resulting zeolite-clay composition of (A) with ammonium phosphate; and thereafter
   (C) heating the resulting composition of (B) with steam.

2. The process of claim 1 wherein said clay is bentonite and said ammonium phosphate is added in an amount to provide a phosphorus content in the range of from about 0.5 to about 10 weight percent.

3. The process of claim 1 wherein said steam treatment is carried out at a temperature of about 650° C. for a period of about 4 hours.

* * * * *